Mar. 3, 1925. 1,528,064
E. D. LYNCH
CURRENT COLLECTOR FOR VEHICLES
Filed Nov. 2, 1921
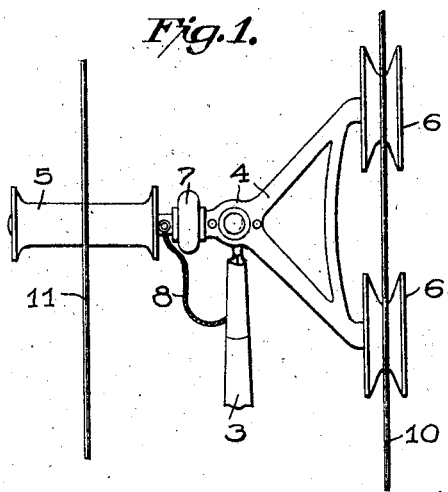
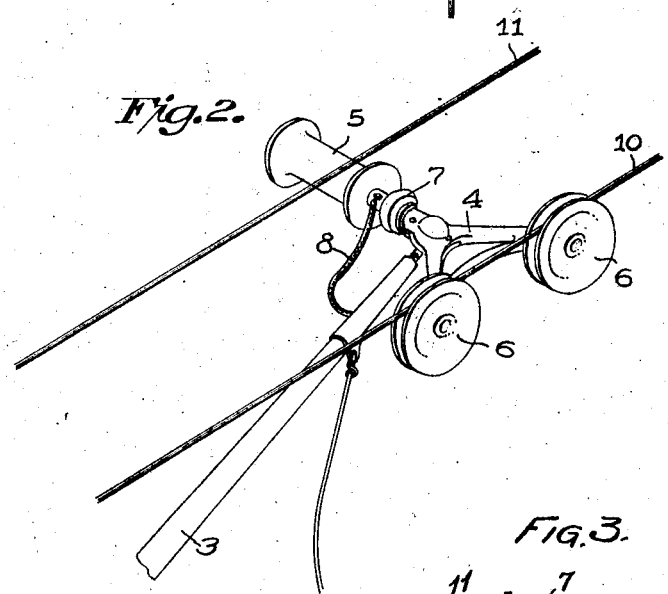
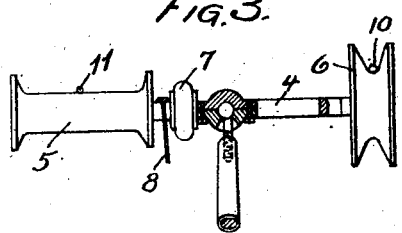
WITNESSES:
INVENTOR
Edward D. Lynch,
BY
ATTORNEY Patented Mar. 3, 1925.

1,528,064

UNITED STATES PATENT OFFICE.

EDWARD D. LYNCH, OF WILKINSBURG, PENNSYLVANIA, ASSIGNOR TO WESTINGHOUSE ELECTRIC & MANUFACTURING COMPANY, A CORPORATION OF PENNSYLVANIA.

CURRENT COLLECTOR FOR VEHICLES.

Application filed November 2, 1921. Serial No. 512,223.

*To all whom it may concern:*

Be it known that I, EDWARD D. LYNCH, a citizen of the United States, and a resident of Wilkinsburg, in the county of Allegheny and State of Pennsylvania, have invented a new and useful Improvement in Current Collectors for Vehicles, of which the following is a specification.

My invention relates to current collectors and particularly to those of the trolley type that are employed in conducting current from a pair of trolley wires.

My invention is directed especially to current collectors for use in connection with trackless trolley cars, or trolley busses, wherein a plurality of current collectors are employed and wherein provision must be made for maintaining engagement with a pair of conductors notwithstanding movements by the vehicle to either side of its normal path of travel.

The object of my invention is to provide, on a single pole, a simple means whereby the engagement of contacting devices with a pair of trolley wires may be maintained, notwithstanding deviations by the vehicle from the normal path of travel, or irregularities in alignment of the two trolley wires with respect to one another.

As shown in the accompanying drawing,

Figure 1 is a plan view of a portion of a trolley pole with my invention applied thereto, Fig. 2 is a view thereof in perspective, and Fig. 3 is a front view thereof, the ball-and-socket joint being shown in section.

A trolley pole 3 may be mounted upon a vehicle, not shown, by means of an ordinary swivel base and biased upwardly by springs or pneumatic means in the usual manner.

The pole, at its upper end, carries a cross-head 4 that has a ball-and-socket connection with the pole 3 in order to permit of universal movement with respect thereto. The cross-head 4 is provided, at its respective ends, with a trolley wheel 5 and a pair of trolley wheels 6. The trolley wheel 5 is insulated from the pole 3 by means of a connection 7 of insulating material, and is electrically connected to the apparatus in the car by means of a flexible conductor 8 a portion of which is disposed within the pole. The wheels 6 have electrical connection with the apparatus in the vehicle through the cross-head 4 and the pole 3.

The wheels 6 may be of the ordinary grooved type adapted to engage a trolley wire 10. The wheel 5, which co-operates with a trolley wire 11, is provided with a wide engaging surface that permits sliding movement thereof in a direction transversely of the wire 11. The two wheels 6 are arranged in tandem, to more effectively maintain proper alinement of the collectors with the trolley wires.

It will be apparent that, should there be irregularities in the lateral spacing of the wires, the wheel 5 would slide transversely on the wire 11 to compensate for such irregularities. Furthermore, it will be clear that, in view of the fact that, as the pole is normally biased upwardly and a ball-and-socket joint is provided for the connection of the cross-head thereto, the wheels at the respective ends of the cross-head are always maintained in yielding engagement with the trolley wires. This arrangement insures that a constant engagement will be maintained between the wheels and the wires even though the wires should occupy different horizontal planes, or, in other words, be displaced vertically with respect to one another.

Various modifications may be made in the invention without departing from the spirit and scope thereof, as defined in the accompanying claims. For instance, shoes instead of wheels may be employed, and a single grooved wheel instead of a pair of grooved wheels 6 may be employed.

I claim as my invention:—

1. The combination with a trolley pole, of a cross-head mounted thereupon for universal movement and normally lying in a transverse direction, a current collector mounted adjacent to one end of the cross-head, a second current collector mounted adjacent to the other end of the cross head, the said current collectors being adapted to engage the trolley wires, means whereby transverse movement between one current collector and its associated wire is permitted, and means whereby relative movement in a transverse direction is prevented between the other current collector and its associated wire.

2. The combination with a pair of trolley wires, of a trolley pole provided at its upper end with a cross-head, a pair of grooved current collectors mounted adjacent to one end of the cross-head in tandem relation and in position to engage one of the trolley wires, and a single current collector having a relatively wide engaging surface mounted adjacent to the other end of the cross-head in position to engage the other of said trolley wires.

3. The combination with a pair of trolley wires, of a trolley pole provided at its upper end with a cross-head, a pair of grooved current collectors mounted adjacent to one end of the cross-head in tandem relation and in position to engage one of the trolley wires, and a single current collector having a relatively wide engaging surface mounted adjacent to the other end of the cross-head and adapted to co-operate with the other of said trolley wires, and a ball-and-socket connection between the cross-head and the pole.

4. The combination with a pair of trolley wires, of a trolley pole provided at its upper end with a cross-head, a pair of grooved current collectors mounted adjacent to one end of the cross-head in tandem relation and in position to engage one of the trolley wires, and a single current collector having a relatively wide engaging surface mounted adjacent to the other end of the cross-head in position to engage the other of said trolley wires, and means whereby the cross-head is supported for movement in a transverse vertical plane.

5. The combination with a trolley pole, of a cross-head mounted thereupon and normally disposed transversely of the pole, a current collector mounted adjacent to one end of the cross-head, a second current collector mounted adjacent to the other end of the cross-head, both of the current collectors being positioned to engage the trolley wires, means whereby transverse movement between one current collector and its associated wire is permitted, means whereby relative movement in a transverse direction is prevented between the other current collector and its associated wire, and means whereby the current collectors may have pivotal movement in a transverse vertical plane.

6. The combination with a pair of trolley wires, of a pair of tandem mounted current collectors and a laterally spaced current collector co-operating therewith said collectors being mounted upon a single supporting member, and means permitting relative lateral movement as between one of the collectors and its associated wire.

7. The combination with a pair of trolley wires, of a trolley pole, a pair of grooved current collectors supported by the trolley pole in position to engage one of the trolley wires, and a single current collector having a relatively wide engaging surface supported by the trolley pole in position to engage the other of said wires.

8. The combination with a pair of trolley wires, of a trolley pole, a pair of grooved current collectors supported by the trolley pole in position to engage one of the trolley wires and a single current collector supported by the trolley pole in position to engage the other of said wires, the last-named collector being provided with a wide surface to permit of lateral movement between said collector and its associated wire.

In testimony whereof, I have hereunto subscribed my name this 22nd day of October, 1921.

EDWARD D. LYNCH.